United States Patent Office 3,184,531
Patented May 18, 1965

3,184,531
REFRACTORY MONOLITH OF PREFORMED
GRAIN AND DEAD BURNED MAGNESITE
Donald Orr McCreight, Bethel Park, and Albert Lajos Renkey, Pittsburgh, Pa., assignors to Harbison-Walker Refractories Company, Pittsburgh, Pa., a corporation of Pennsylvania
Filed Jan. 10, 1963, Ser. No. 250,626
5 Claims. (Cl. 13—35)

This invention relates to refractory mixes, and more particularly to ramming mixes suitable for fabrication of monolithic refractory linings for induction furnaces used in treating steel.

In general, induction furnaces can be divided into two classes: (1) the coreless induction furnace, (2) the core-type low frequency induction furnace. The ramming mixes of this invention are particularly suited for use in lining coreless-type induction furnaces. The coreless induction furnace consists of a primary (the furnace coil), and a secondary (the molten metal). The core-type has a laminated core, which serves as the primary. When alternating current is applied to the primary, a current is induced in the secondary. The induced current rapidly heats the metal bath and melts any scrap or solid metal in the charge. Furnaces of this type are generally used in the production of stainless and other highly alloyed and low carbon steels.

The refractory lining for coreless induction furnaces may be either acid or basic. Basic linings are more common in the United States. The refractory lining can be constructed from a plurality of preformed shapes, which are laid up with mortar, or it can be made from unconsolidated refractory materials which are mixed with a suitable tempering fluid and rammed, cast or gunned into a form to provide a monolithic lining structure.

The cost of laying up of a plurality of preformed shapes is high, and the necessity of a plurality of varying shape designs also decreases the desirability of this type of lining. Furthermore, the mortared joints between preformed shapes present areas more susceptible to penetration, thus increasing the possibility of short-circuiting the induction coils.

Thus, ramming mixes, which may be used to fabricate a lining in situ, have been preferred. Also, rammed linings provide a stronger and more dimensionally stable refractory mass, substantially free of weak points. However, many linings fabricated of previously available ramming mixes have had the distressing characteristic of flaking off into the molten charge, which resulted in undesirable inclusions in metal shapes made from the charge, and shorting-out of the coils through metal penetration.

It is desired that the molten metal contacting surfaces of the induction furnace lining be relatively smooth, and that the lining itself be very tight. Many previously available ramming mixes for induction furnaces have not provided these features.

Accordingly, it is an object of this invention to provide unconsolidated refractory batches suitable for use in fabrication of monolithic linings for metallurgical vessels. It is another object of this invention to provide improved ramming mixes for the fabrication of linings for induction furnaces. It is yet another object of this invention to provide improved refractory linings for induction furnaces, which linings are characterized by relatively smooth molten metal contacting surfaces, which do not flake off in service, which after burn-in, are firm and tight, and which are less prone to cracking.

Briefly, in one embodiment, a ramming mix according to this invention is comprised of a batch mixture of size graded dead burned magnesite and preformed spinel grain. The preformed spinel grain is primarily mineralogically characterized by an extensive magnesium-aluminate spinel content and by alumina in the form of beta alumina and calcium aluminate. The preformed spinel grain is substantially all in the coarse, +65 mesh fraction of the batch.

The following examples are given by way of explanation and not by way of limitation. In all of the examples, the method of manufacture for test specimens was as follows: the dry ingredients were mixed in a Clearfield mixer for about five minutes; about 4.5% of a tempering fluid was then added to the dry ingredients and mixing continued for a further five minutes. The tempering fluid which we used in the laboratory was comprised of about two parts lignin liquor and about 2.5 parts of water, both based on the total weight of the dry solids. Of course, other tempering fluids, well known to those skilled in the art, may be used. Further, water alone may be used, or the mix may be rammed entirely dry. The wet batches were formed into shapes by power pressing at about 3000 p.s.i.

About 80 parts of size graded, dead burned magnesite and 20 parts of size graded, preformed spinel grain, of a particular mineralogical character, were prepared in the manner just discussed. The magnesite had a chemical analysis of about 98% MgO, the remaining 2%, by difference, being $SiO_2$, CaO, $Fe_2O_3$, alkalies and ignition loss. An exemplary preformed spinel analyzed about 73% $Al_2O_3$, about 18.5% MgO, about 0.5% $SiO_2$, about 0.7% $Cr_2O_3$, about 2.5% CaO, about 0.5% $Fe_2O_3$, the remainder, by difference, being alkalies, other impurities and ignition loss. The foregoing analyses, of course, are but typical and are on the basis of an oxide analysis, in conformity with the conventional practice of reporting the chemical analysis of refractory materials.

The preformed spinel grain of this invention was subjected to detailed microscopic and X-ray diffraction study. The X-ray diffraction studies revealed the presence of magnesium aluminate spinel, beta alumina, and calcium aluminate as major phases, with lesser amounts of various impurities. The magnesium aluminate spinel was the single largest phase, amounting to about 60% of a representative sample studied. The beta alumina was present in an amount equal to about 8% of the sample, and calcium aluminate ($CaO \cdot 6Al_2O_3$) amounted to about 20%. Further studies showed that the magnesium aluminate spinel ranged between about 50 and 70% of the sample, the beta alumina between about 5 and 10%, with the calcium aluminate being present in amounts between 15 and 25%. Impurities ranged from 5 to 10%.

Microscopic examination in reflected and transmitted light substantiated the X-ray diffraction analysis and revealed a strong lath-like crystalline development of calcium aluminate and beta alumina, particularly adjacent pores. The magnesium aluminate spinel occurred as massive to euhedral accumulations, developing cubic form particularly when embedded among well developed crystals of translucent calcium aluminate. The accompanying drawing is illustrative of the foregoing. The drawing is a photomicrograph of a polished section of a representative sample of the spinel grain of this invention at 173×magnificantion, using reflected light. In the drawing, the intermediate gray phase 10 is magnesium aluminate spinel. The darker gray areas 11 are beta alumina, while the lightest, somewhat translucent areas 12 are calcium aluminate. Note the definite lath formations 13 which are comprised of magnesium aluminate spinel and calcium aluminate. Note the cubic formation of the magnesium aluminate spinel as at 15 intercalated with laths of beta alumina. Such intercalation can occur with either calcium aluminate as at 13 or with the beta alumina.

Generally, the preformed spinel grain may be mineralogically characterized as including an extensive and major amount of massive to euhedral accumulations of magnesium aluminate spinel, with lesser amounts of lath-like beta alumina and calcium aluminate particularly adjacent pores. Little vitrification could be microscopically observed.

A preferred size grading for the dry ingredients, which was used for the batch just discussed, is as follows: 4 on 10 mesh about 28%, 10 on 28 mesh about 26%, −28 mesh—46%. Of the −28 mesh fraction, about 30% passed a 150 mesh screen. The preformed spinel grain was substantially all −14+65 mesh, with the dead burned magnesite being so size graded as to provide the desired total screen analysis for the batch. It is essential to this invention, as is developed in more detail below, that the preformed spinel grain substantially all be in the −14+65 mesh fraction of the mix. It should be of course understood, however, that some variance may be had therefrom, and usable batches will still result. In fact, in commercial application of this invention, it is difficult to prevent some variation from the preferred range. For example, satisfactory mixes may include the preformed spinel grain in the range −4+100 mesh. Desirably, no more than about 20% of the preformed spinel grain passes a 100 mesh screen. This would amount to about 9% of the total dry solids in the batch.

The bulk density of dried green shapes made from the foregoing batch average 173 p.s.i. at room temperature, 170 after a 2550° F. reheat, 172 p.s.i. after a 2910° F. reheat, and 173 p.s.i. after a 3000° F. reheat. In these "reheats" a sample is fired to the given temperature according to a standard ASTM schedule, and held at that temperature for a prescribed number of hours. This density variation is interesting evidence of the chemical reaction, upon burning, between the beta alumina in the preformed spinel grain, and the magnesite fines, in forming additional magnesium aluminate spinel, in situ. This magnesium aluminate spinel which forms in situ provides an interstitial bond between the preformed spinel grain and the size graded magnesite in the batch. Some expansion is associated with the formation of this spinel. Limited expansion is desirable in a service installation, such as in an induction furnace lining, since it promotes a very tight fit of the lining in the induction furnace vessel.

The cold crushing strength of the shapes made from the foregoing batch averaged 4050 p.s.i. after a 2550° F. reheat, and 3600 p.s.i. after a 3000° F. reheat.

A comparative batch was made using the same dead burned magnesite and preformed spinel grain (all −14+65 mesh) discussed above, but in which the preformed spinel constituted about 40%, by weight, of the mix. The batch had the same overall size grading set forth above. The density of shapes made therefrom (as noted above, the same manufacturing techniques were used) averaged 172 p.c.f. after drying, and only 168 p.c.f. after a 3000° F. reheat. Even more interesting is the fact the cold crushing strength after a 2550° F. reheat averaged only 1680 p.s.i. and only 1690 p.s.i. after a 3000° F. reheat. Furthermore, the permeability of these shapes was almost twice as great as those shapes made from the batch having 20% −14+65 mesh preformed spinel grain. Of course, low permeability is a desirable attribute in the lining of induction furnaces.

In still other tests, batches were fabricated of similar dead burned magnesite and preformed spinel grain, but in which the preformed spinel was entirely in the −150 mesh fraction of the mix. In one batch, the preformed spinel grain constituted 20% of the total solids in the batch, and in a second batch it constituted 40%. In both of these batches, the overall size grading was the same as that set forth above. Shapes made from these batches had lower densities at room temperature and after a 3000° F. reheat. The cold crushing strength, after a 2550° F. reheat, averaged, for shapes made from these batches, 3140 p.s.i. and 2330 p.s.i., respectively. However, even more interesting, after a 3000° F. reheat, the respective cold crushing strengths averaged 1670 p.s.i. and 1360 p.s.i.

As a practical matter, a workable range for the preformed spinel grain is from about 10 to 40%, by weight, of the total dry solids in the batch. As 40% is approached and passed, however, the cold crushing strength after a 3000° F. reheat becomes undesirably low, and the density decreases noticeably. As the 10%, by weight, lower limit for the preformed spinel grain is approached, the desirable in situ bonding ceases to have any marked effect of the strength of shapes made therefrom. Furthermore, the expansion associated with the in situ formation of magnesium aluminate spinel is almost negligible, and the desirable characteristic of promoting tight fit in burn-in is lost. The best range for the preformed grain is considered 15 to 30% of the dry solids in the batch.

The preformed spinel grain of this invention is preferably recovered from a fusion process, in which magnesite and alumina are present in weight quantities providing an excess of $Al_2O_3$ over that required to form $MgO \cdot Al_2O_3$. The spinel grain analysis reported above shows approximately 25%, by weight, excess $Al_2O_3$ in the form of beta alumina and calcium aluminate over that required to completely react with the MgO present to form magnesium-aluminate spinel.

In still other comparative tests, batches were made up of dead burned magnesite, alumina and clay, to provide oxide analyses comparable to the oxide analyses of our preferred batches of magnesite and preformed spinel. Some shapes made from these comparative batches expanded enormously, and all of the shapes had expansion far in excess of that which could be tolerated in a furnace lining. For example, one group of shapes, made of a mixture of about 75 parts dead burned magnesite and 25 parts of alumina and clay, so proportioned as to provide an oxide analysis similar to our preferred batches, had a volume expansion of 18% after a 3000° F. reheat.

In the foregoing discussion, all size gradings are according to the Tyler mesh series. All parts and percentages are by weight.

Having thus described the invention in detail and with sufficient particularity as to enable those skilled in the art to practice it, what we desire to have protected by Letters Patent is set forth in the following claims.

We claim:

1. As the lining of an induction furnace, a refractory monolith formed by ramming a tempered, size graded, refractory batch mixture which includes a coarse fraction and a fine fraction, said mixture consisting essentially of dead burned magnesite and preformed grain, said grain substantially all being in the coarse fraction of the batch and constituting about 10–40%, by weight, of the total weight of the batch, said grain including, by weight, the following constituents:

| | Parts |
|---|---|
| Magnesium aluminate | 50 to 70 |
| Beta alumina | 5 to 10 |
| Calcium aluminate | 15 to 25 |

2. In the lining of claim 1, substantially all said preformed grain being −4 +100 mesh.

3. In the lining of claim 1, substantially all of said preformed grain being −14 +65 mesh.

4. A dry, unconsolidated size graded refractory batch mixture including a coarse fraction and a fine fraction, said mixture consisting essentially of dead burned magnesite and preformed grain, said grain substantially all in the coarse fraction of the batch and constituting from 10–40%, by weight, of the total weight of the batch, said grain characterized by extensive amounts of magnesium aluminate, beta alumina, and calcium aluminate in the following proportions, by weight:

| | Parts |
|---|---|
| Magnesium aluminate | 50 to 70 |
| Beta alumina | 5 to 10 |
| Calcium aluminate | 15 to 25 | said grain mineralogically characterized by an extensive and major amount of massive to euhedral accumulations of magnesium aluminate with lesser amounts of lath-like crystals of said beta alumina and calcium aluminate particularly adjacent pores.

5. In the batch of claim 4, substantially all said preformed grain being −4 +100 mesh.

References Cited by the Examiner
UNITED STATES PATENTS 1,075,659  10/13  Mankau _____ 106—62 X
2,757,219  7/56   Clough et al. _____ 13—35

FOREIGN PATENTS 825,908  12/59  Great Britain.

RICHARD M. WOOD, *Primary Examiner.*
JOSEPH V. TRUHE, *Examiner.*